3,149,167
PROCESS FOR OXIDIZING OLEFINS TO
ALDEHYDES AND KETONES
Lothar Hörnig, Emmerich Pászthory, and Rudolf Wimmer, all of Frankfurt am Main, Germany, assignors to Farbwerke Hoechst Aktiengesellschaft vormals Meister Lucius & Brüning, Frankfurt am Main, Germany, a corporation of Germany
No Drawing. Filed Sept. 23, 1960, Ser. No. 57,907
Claims priority, application Germany Sept. 26, 1959
5 Claims. (Cl. 260—597)

The present invention relates to a process for oxidizing olefins to aldehydes, ketones and/or acids.

In several patent specifications, for example, in U.S. patent applications Ser. Nos. 747,115, now abandoned; 747,116; 750,150; 760,539, now U.S. Patent No. 3,057,915; 763,691, now abandoned; 765,272, now U.S. Patent No. 3,104,263 and 791,816, now abandoned, filed on July 8, 1958; July 8, 1958; July 22, 1958; September 12, 1958; September 26, 1958; October 6, 1958; and February 9, 1959, are described processes for oxidizing ethylene or other olefins, for example, propylene, butylene, isobutylene or pentene, to the corresponding aldehydes, ketones and/or acids by treating them with oxygen or oxygen-containing gases, if desired, in admixture with an inert gas, in a neutral to acid medium and in the presence of water by means of a liquid catalyst containing a redox system and a noble metal compound. The redox system may have a specific catalytic action as is described, for example, in the above-mentioned specifications 765,272 and 791,816.

As noble metals there are advantageously used those of Group VIII of the Periodic Table having a stable valency of at most 4, such as ruthenium, rhodium, iridium, platinum or preferably palladium. As compounds capable of forming redox systems and present in the catalyst there may be used salts of mercury, cerium, thallium, tin, lead, titanium, vanadium, antimony, chromium, molybdenum tungsten, uranium, manganese, iron, cobalt or nickel and advantageously copper, which under the reaction conditions are soluble in water or a weakly acid medium, or mixtures of salts of several elements, for example, the chlorides, bromides, chlorates, perchlorates or nitrates or mixtures of such salts with sulfates or acetates. The aforesaid salts may be present in the catalyst liquid from the beginning. The noble metal salts may also be formed during the reaction when the other above-mentioned metal salts are already present in addition to finely powdered noble metal.

U.S. patent applications 747,115 etc. mentioned above and U.S. patent application Ser. No. 769,554 filed October 27, 1958, now abandoned, disclose an embodiment of the olefin oxidation according to which the process is carried out in a tube or a reactor of any desired shape through which the catalyst liquid and the gases to be reacted flow at a high speed. In this mode of operating there is a direct relation between the degree of mixing of the heterogeneous system consisting of reaction gas and catalyst liquid and the degree of conversion or the space-time yield: The better the mixing, the higher is the degree of conversion or the space-time yield. This applies to processes comprising one stage as well as to processes comprising two stages. In the last-mentioned processes reaction and regeneration are carried out in separate stages.

It has now been found that the total pressure drop can be distributed in the reaction zone or the reaction and regeneration zones in such a manner that in the beginning of the process the pressure is not considerably lower than the initial pressure and the loss of pressure is increased in the direction of flow of the heterogeneous system after the partial pressure of the gaseous and vaporous products used has dropped to a larger extent.

As reaction and/or regeneration vessel there may advantageously be used a tube, the cross-sectional area of which is narrowed by degrees and/or continuously in the direction of flow of the heterogeneous system in such a manner that the linear velocity of flow and, consequently, the loss of pressure are increased in spite of the increasing conversion of the reaction gases. It is also possible to provide the part of the apparatus through which the material flows with turbulence sites at which the flow is disturbed, so that the drop of pressure is essentially increased as the reaction proceeds.

By places disturbing the flow there are to be understood places at which the space through which the material flows is modified, which leads in its turn to a modification of the direction of flow and thereby brings about a mixing of the heterogeneous system occurring simultaneously with a drop of pressure.

The disturbance may be brought about, for example, by so-called lower packings of the most various types, for example, balls, spirals, nets or rings, which consist of a material which is resistant to the catalyst, for example, titanium, ceramics, glass or polytetrafluoroethylene. There may also be used, for example, guiding devices, such as screens, grids, perforated plates, diaphragms, devices constricting the space of flow, bubble plates and the like.

The turbulence sites may be arranged in the vessel through which the catalyst and the reaction gases or vapors flow, for example, in such a manner that only certain spaces of the vessel are completely packed and these packed spaces are distributed in the vessel in such a manner that in the direction of flow of the heterogeneous system the unpacked spaces become smaller and smaller. Alternatively, the unpacked spaces may, for example, be all of the same size if the packings in the packed spaces are of different kind, so that the resistance to flow of the individual packed spaces is increased in the direction of flow. As packings for the individual turbulence sites there may, for example, be used only Raschig rings or only spirals etc., that is to say packings of the same type which are, however, different in size, namely become smaller in the direction of flow. Alternatively, the packed spaces may contain different packings, for example, the first packed spaces in the direction of flow may contain power packing bodies according to Berl, the middle packed spaces Raschig rings and the last ones balls, that is to say, the packed spaces contain packings which increase the loss of pressure or the resistance to flow in the direction of flow.

If, for example, diaphragms are used as disturbing means they may either all have openings of the same size and be inserted in such a manner that the distances between them become smaller in the direction of flow or they may be mounted at equal distances and have openings which become smaller in the direction of flow.

The process of the invention is not limited to the above-mentioned embodiments. It is, for example, also possible to insert disturbing means of different kinds, for example, packed spaces and/or guiding devices and/or devices reducing the area and/or bubble trays, in one and the same reaction and/or regeneration vessel and, in addition, the cross-sectional area of the unpacked reaction and/or regeneration vessel may simultaneously be reduced in the direction of flow.

If under the reaction conditions used the linear velocity of the heterogeneous system is smaller than the linear velocity that, in particular in reaction vessels having a horizontal position, is necessary to prevent the mixture of gas or vapor and liquid from separating, it is suitable to pack the whole of the flow space with packings or to provide it with other disturbing means which are all of the same kind and which are inserted at equal distances, and to mount in addition thereto disturbing means according to the invention. The whole flow space may, for example, be packed with packings which become smaller in the direction of flow.

A process can be carried out in a particularly economical way when the degree of mixing of the heterogeneous system is just sufficient to ensure a maximum degree of conversion. A higher degree of mixing means a useless loss of energy in the form of a loss of pressure. At a given total loss of pressure the invention ensures the highest possible actual pressure to be produced in the whole of the reaction or regeneration space and the invention consequently enables the highest possible yield or the greatest space-time yield to be obtained at a given expenditure of energy.

The measure according to the invention enables a constant space-time yield to be obtained at a lower pressure drop or a higher space-time yield to be obtained at the same pressure drop, the degree of conversion remaining the same. For example, when the olefin and oxygen are converted to an extent of almost 100% space-time yields within the range of 500 to 3000 grams of aldehyde and/or ketone are obtained per hour and per liter of jacketed reaction space.

The process of the invention can also be applied when the reactant or reactants are diluted, for example, with carbon dioxide, chlorinated short-chained aliphatic hydrocarbons, nitrogen, hydrogen, low boiling aliphatic hydrocarbons such as methane, ethane, propane, butane, isobutane, pentane or saturated aliphatic hydrocarbons of higher moleculare weight, or cyclohexane or vapors of inert substances such as benzene. Mixtures of the aforesaid kind may be obtained by the various forms of olefin oxidation. On the other hand, owing to the measures according to the invention there may be used with advantage diluted olefins, for example, mixtures of ethane and ethylene or of propane and propylene, or olefins to which other gaseous and/or vaporous compounds, for example, hydrogen, carbon dioxide, carbon monoxide or aromatic hydrocarbons, have been added.

If desired, air or air enriched with oxygen may be used instead of pure oxygen.

The oxygen or the gas containing oxygen may be reacted with the catalyst, if desired, in a regeneration zone which is separated from the reaction zone. This mode of operating is particularly suitable when the oxygen is used in diluted form, for example, in the form of air. When operating in the aforesaid manner part of the oxygen or the oxygen-containing gas may additionally be admixed with the olefin. It is also possible to oxidize gases which already contain olefins and oxygen, for example, the waste gases obtained by other methods of olefin oxidation. The reactants may be introduced either after having previously been mixed with one another or they may be introduced separately through one or several lines which, if desired, are arranged one behind the other in the direction of flow of the catalyst.

If an extent of conversion of olefin of 100% is to be obtained, the proportion of olefin to oxygen must not be superior to about 2:1. It must be at least 2:1 in order to ensure a complete reaction of the oxygen and it should be about 2:1 in order to ensure an extent of conversion of olefin and oxygen of 100%. With a view to the complete conversion of one or both of the components it is also essential to adjust the duration of stay, the temperature and the pressure to one another. If other reactive gases are present which under the reaction conditions oxidize more quickly than olefins, for example, carbon monoxide, the portion in which these gases are contained in the starting gas mixture has to be taken into consideration when the appropriate quantity of oxygen is chosen which is necessary for the complete conversion of the olefin.

The reaction temperature which in processes using catalysts containing noble metal salts is suitably within the range of 50° to 250° C. and preferably within the range of 120° to 200° C. and which may also be higher or lower than that, is kept as low as possible within the aforesaid range, especially when oxygen is present simultaneously with the olefin, in order to avoid large losses of yield caused by the formation of by-products. The heterogeneous system consisting of reaction gas mixture and catalyst liquid is under a pressure which is greater than the steam saturation pressure of the heterogeneous system. The oxygen or the gaseous mixtures containing oxygen may, if desired, be irradiated with active, for example, ultraviolet, light, suitably near the place at which they are introduced.

The process according to the invention can be applied not only for the conversion of ethylene into acetaldehyde and acetice acid, but also for the reaction of higher olefins, for example, propylene, the butylenes and pentenes. From propylene, for example, there are chiefly obtained acetone and propionic aldehyde, from the butylenes methyl ethyl ketone, butyric aldehyde or isobutyric aldehyde is obtained and from butadiene, diacetyl and crotonaldehyde are obtained. Instead of the pure olefins mixtures of different olefins, for example, of low boiling and higher boiling olefins, for example, mixtures of ethylene and butylene or ethylene and propylene, may be used.

Another preferred mode of carrying out the process of the invention is to use catalysts containing chlorine ions and to add further anions, more particularly chlorine ions, for example, chlorine ions in the form of hydrogen chloride, or compounds yielding chlorine ions, for example, acetyl chloride, ethyl chloride, tertiary butyl chloride or bromotrichloride, during the reaction. In this case the proportion of copper and chlorine is suitably within the range of 1:1 to 1:3 and preferably within the range of 1:1.4 to 1:1.25, the chlorine ions contained in neutral salts such as sodium chloride being not included in the aforesaid proportions. The process may be carried out in an analogous manner when bromides or mixtures of chlorides and bromides are used instead of the chlorides.

The pH value is suitably within the range of 0.8 to 5. If desired, it may be below 0.8 or above 5, for example, 0.5. When the process is carried out in two stages the catalyst can be regenerated under known conditions, for example, at temperatures within the range of 50° to 150° C., and also at pressures and/or temperatures different from those applied in the reaction stage. In order to reduce the steam pressure, substances having the effect of lowering the boiling point, for example, salts, may be added to the catalysts. The presence of salts may also be of advantage for other reasons. There may, for example, be used the chlorides or acetates of lithium, sodium, potassium, ammonium, calcium, barium, magnesium, or zinc, $FeCl_3$, $FeCl_2$ or salts of the aforesaid elements with other anions. When liquid catalysts are used there may additionally be used solvents containing hydrophilic groups, for example, acetic acid, ethylene glycol, propylene glycol, glycerol, dioxane or mixtures thereof.

When the process of the invention is carried out in the absence of noble metals and in the presence of organic redox systems, as is described in U.S. patent applications Ser. Nos. 765,272 and 791,816 mentioned above, the temperature applied is in general within the range of 50° and 250° C., suitably within the range of 100° to 250° C. and preferably within the range of 130° to 200° C. and the pressure applied is within the range of up to 400 atmospheres (gage), suitably within the range of 20 to 200 atmospheres (gage) and preferably within the range of 80 to 120 atmospheres (gage). Naturally, the reaction may be carried out at lower or higher temperatures and/or under lower or higher pressures, for example, at a temperature above room temperature or under atmospheric pressure or under a pressure of 450 atmospheres (gage). When the process according to the invention is carried out under these conditions the pH value is advantageously within the range of 1 to 5, although higher or lower pH values, for example, a pH value of 0, may also be applied.

The velocities of the heterogeneous system consisting of catalyst liquid and reaction gas or reaction vapors applied in the process of the present invention are advantageously the same as those indicated in U.S. patent applications Ser. Nos. 747,115 etc. mentioned above and in U.S. patent application Ser. No. 706/60 filed January 1, 1960.

The following examples serve to illustrate the invention but they are not intended to limit it thereto.

*Example 1*

A heatable titanium tube having a length of 20 meters and an inside diameter of 10 millimeters, which was arranged horizontally and sinuously shaped in such a manner that each bend was at a distance of about 2 meters from the next bend, was charged per hour with 1.5 cubic meters (measured at N.T.P.) of a mixture of ethylene and nitrogen containing 75% by volume of ethylene, 0.75 cubic meter (at N.T.P.) of oxygen and 70 liters of an aqueous catalyst liquid containing, per liter, 170 grams of copper chloride.$2H_2O$, 3.5 grams of palladium chloride and 50 grams of acetic acid. The reaction temperature was 140° C. The pressure amounted to 16 atmospheres (gage) at the inlet of the reactor and to 3.5 atmospheres (gage) at the outlet of the reactor, the total loss of pressure being 12.5 atmospheres. After having passed through the reactor the catalyst was stripped with direct steam under a pressure of 3 atmospheres (gage) and the mixture of gas and vapor issuing at the head of the column was washed with water and thereby freed from acetaldehyde. After the stripping operation the catalyst was recycled to the reactor by means of a pump.

The reactor contained four turbulence sites which had been formed by packing these parts of the tube with Raschig rings of a diameter of 3 millimeters. The disturbing spaces were distributed in the following way in the direction of flow: 3.5 meters of unpacked tube, 0.5 meter of disturbing space, 2.5 meters of unpacked tube, 1.5 meters of disturbing space, 1.5 meters of unpacked tube, 2.5 meters of disturbing space, 0.5 meter of unpacked tube, 7.5 meters of disturbing space. The space-time yield amounted to 1300 grams of acetaldehyde per hour and per liter of jacketed reaction space. About 96% of the ethylene used had been converted into acetaldehyde. The yield amounted to 98%.

When the above experiment was repeated under the same conditions with the exception that the packed spaces containing Raschig rings having a diameter of 3 millimeters were arranged in the reactor at equal distances and had a length of 1 meter each, the space-time yield amounted to about 800 grams per liter and per hour, the extent of conversion was about 60% and the yield was 98%.

*Example 2*

A separate two-stage apparatus contained a reactor and a regenerator. The reactor consisted of a heatable titanium tube having a length of 20 meters and an inside diameter of 10 millimeters and which was horizontally arranged and sinuously shaped in such a manner that each bend was at a distance of about 2 meters from the next bend. The reactor contained four turbulence sites which had been formed by packing these parts of the tube with Raschig rings having a diameter of 3 millimeters. The disturbing spaces were arranged in the following way in the direction of flow: 3.5 meters of unpacked tube, 0.5 meter of disturbing space, 2.5 meters of unpacked tube, 1.5 meters of disturbing space, 1.5 meters of unpacked tube, 2.5 meters of disturbing space, 0.5 meter of unpacked tube, 7.5 meters of disturbing space. The regenerator consisted of a heatable titanium tube of a length of 20 meters which was horizontally arranged and sinuously shaped in such a manner that, as in the case of the reactor, each bend was at a distance of about 2 meters from the next bend. The titanium tube of the regenerator had an inside diameter of 12 millimeters in the first 10 meters in the direction of flow, of 10 millimeters in the following 5 meters and of 8 millimeters in the last 5 meters.

By means of two pumps, one of which was arranged before the reactor and the other of which was arranged before the regenerator, the system was charged per hour in a closed cycle with about 80 liters of an aqueous catalyst liquid containing, per liter, 0.045 mol of palladium chloride, 1.8 mols of bivalent copper chloride and 30 grams of acetic acid. 800 liters (at N.T.P.) of a gaseous mixture consisting of 75% by volume of propylene and 25% by volume of propane were introduced per hour into the reactor. 2 cubic meters (at N.T.P.) of air were introduced per hour into the regenerator. The reaction temperature was 145° C., the initial pressure in the reactor was 10 atmospheres (gage), the final pressure was 4 atmospheres (gage) and the loss of pressure was 6 atmospheres. The regeneration temperature was 145° C., the initial pressure in the regenerator was 18 atmospheres (gage), the final pressure was 4 atmospheres (gage) and the loss of pressure was 14 atmospheres.

The major part of the oxygen in the regenerator that had not been reacted was removed from the catalyst together with the nitrogen by means of a gas expeller. After the pressure had been expanded until it amounted to 2 atmospheres (gage) the gaseous or vaporous portions of the catalyst leaving the reaction zone were separated from the catalyst liquid in a stripping column. The mixture of acetone and propionic aldehyde which predominantly consisted of acetone was separated by a washing with water from the gaseous mixture leaving the stripping column and worked up by distillation The space-time yield amounted to 950 grams of a mixture of acetone and propionic aldehyde per hour and per liter of jacketed reaction space. The yield amounted to 98%.

*Example 3*

A heatable titanium column of a height of 10.8 meters and an inside diameter of 23 millimeters was charged per hour with 500 liters of an aqueous catalyst solution containing, per liter, 200 grams of $CuCl_2.2H_2O$, 4 grams of palladium chloride and 30 grams of acetic acid, 4 cubic meters (at N.T.P.) of a gaseous mixture consisting of 75% of ethylene 10% of carbon dioxide and 15% of ethane, and 1.7 cubic meters (at N.T.P) of oxygen. The reaction temperature was 135° C., the pressure at the inlet of the reactor was 15 atmospheres (gage), the pressure at the outlet of the reactor was 4.5 atmospheres (gage) and the total loss of pressure was 10.5 atmospheres. After having passed through the reactor the catalyst was stripped under normal pressure by blowing in vapor and the mixture of gas and vapor issuing at the head of the stripping column was washed with water and thereby freed from acetaldehyde. The catalyst was recycled into the reactor by means of a pump. 500 cc. of concentrated hydrochloric acid were added per hour to the catalyst.

The reactor had nine turbulence sites which had been formed by packing these parts of the tube with Raschig rings of a diameter of 3 millimeters. The disturbing spaces were distributed in the following way in the direction of flow: 8 disturbing spaces each of which had a length of 10 centimeters were arranged at equal distances in the first 6.6 meters of the titanium column and the residual 4.2 meters were packed over their whole length.

The space-time yield amounted to 1200 grams of acetaldehyde per hour and per liter of jacketed reaction space.

Example 4

A heatable titanium column of a height of 10.8 meters and an inside diameter of 23 millimeters was charged, per hour, with 500 liters of an aqueous catalyst solution containing, per liter, 185 grams of $CuCl_2 \cdot 2H_2O$, 2.5 grams of palladium chloride and 20 grams of acetic acid, 1 cubic meter (at N.T.P.) of ethylene and 2.5 cubic meters (at N.T.P.) of air. The reaction temperature was 140° C., the pressure was 14 atmospheres (gage) at the inlet of the reactor and 4 atmospheres (gage) at the outlet of the reactor, the total loss of pressure amounting to 10 atmospheres.

After having passed through the reactor, the catalyst was stripped under normal pressure by the blowing in of vapor. The mixture of gas and vapor issuing at the head of the stripping column was washed with water and thereby freed from acetaldehyde. The catalyst was recycled into the reactor by means of a pump. 100 cc. of concentrated hydrochloric acid were added per hour to the catalyst.

The reactor contained 9 turbulence sites which had been formed by packing these parts of the tube with Raschig rings having a diameter of 3 millimeters. The disturbing spaces were distributed in the following way in the direction of flow: 8 disturbing spaces having a length of 10 cm. each were inserted at equal distances in the first 6.6 meters of the titanium column and in the remaining 4.2 meters the tube was packed over its whole length.

The space-time yield amounted to 400 grams of acetaldehyde per hour and per liter of jacketed reaction space. The gas obtained after the washing with water contained less than 2% by volume of ethylene and less than 1% by volume of oxygen.

We claim:

1. A process for the conversion of a gaseous olefinic hydrocarbon to a carbonyl compound selected from the group consisting of aldehydes and ketones by oxidation of an olefinic carbon atom of said olefinic hydrocarbon to a carbonyl group, which process consists essentially of contacting said gaseous olefinic hydrocarbon and oxygen with an acid to neutral liquid catalyst by flowing said hydrocarbon and catalyst together through at least one elongated contact zone in which said flow is increasingly impeded in the direction of flow to create turbulence in said flow of a magnitude increasing in the direction of flow, whereby pressure drops of a magnitude increasing in the direction of flow are produced in said flow, said liquid catalyst solution consisting essentially of water, a salt of a noble metal selected from the group consisting of palladium, iridium, ruthenium, rhodium, and platinum, and as a redox system, a salt of a metal showing several valence states under the reaction conditions applied.

2. A process as in claim 1 wherein said olefinic hydrocarbon and liquid catalyst are contacted in a first contact zone, and said oxygen and catalyst are contacted in a second contact zone, and said catalyst is circulated between said first and second contact zones.

3. A process as in claim 1 wherein flow within said elongated contact zone is increasingly impeded in the direction of flow by conical diminution of the flow cross-section in the direction of flow.

4. A process as in claim 1 wherein said flow is increasingly impeded in the direction of flow by packing in said elongated contact zone, said packing producing turbulence of increasing magnitude in the direction of flow.

5. A process as in claim 1 wherein said salt of a metal showing several valence states under the reaction conditions applied is a copper halide.

References Cited in the file of this patent

UNITED STATES PATENTS

| | | |
|---|---|---|
| 1,978,621 | Burke | Oct. 30, 1934 |
| 2,659,758 | Detling et al. | Nov. 17, 1953 |

FOREIGN PATENTS

| | | |
|---|---|---|
| 203,473 | Austria | May 25, 1959 |
| 1,210,009 | France | Sept. 28, 1959 |

OTHER REFERENCES

Smidt et al.: Angewandte Chemie, vol. 71, No. 5, pages 176–182 (1959).